Oct. 7, 1930.  T. H. STOUGH  1,777,940
HOT PLATE ATTACHMENT FOR COOKING UTENSILS
Filed Feb. 25, 1930
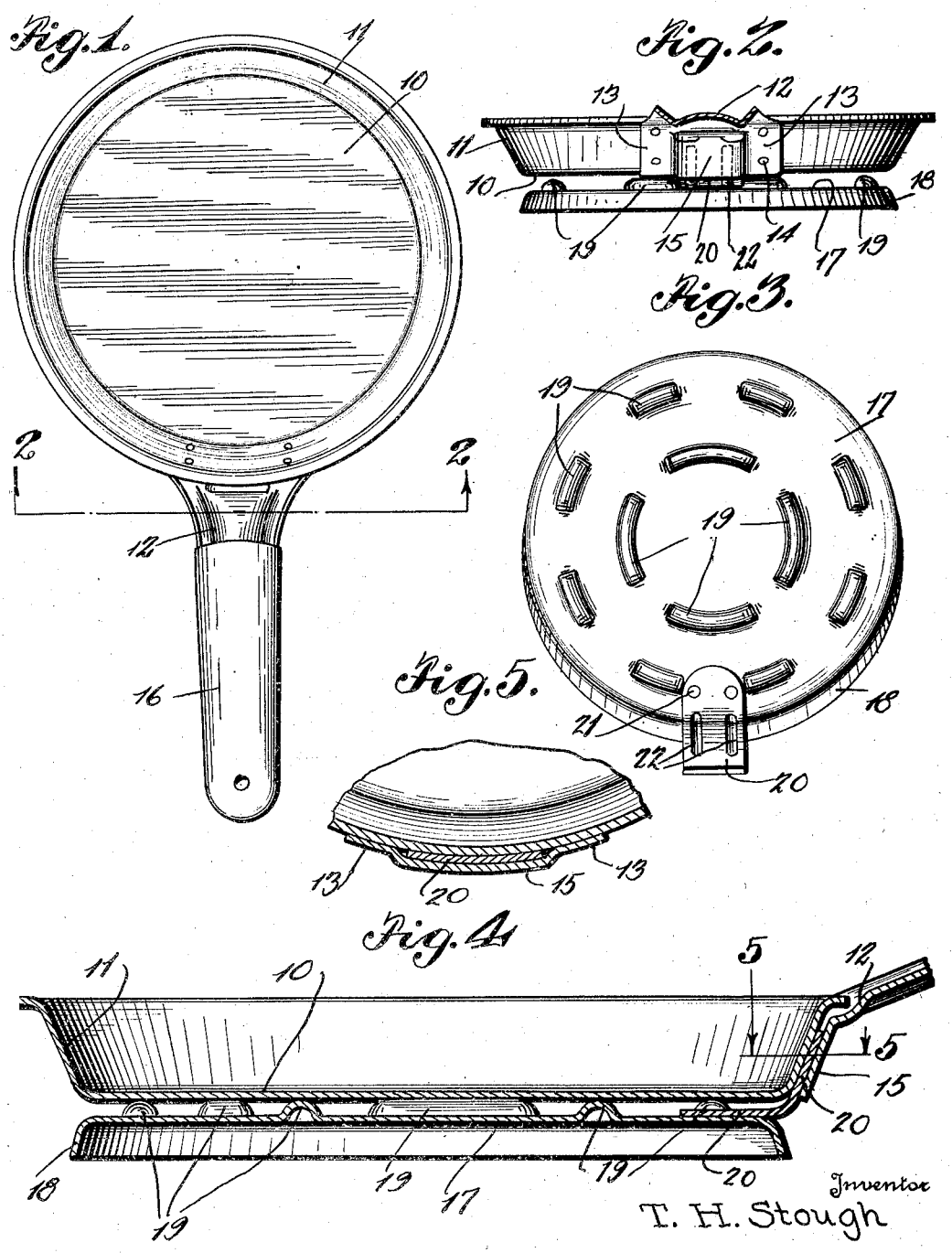

Patented Oct. 7, 1930

1,777,940

UNITED STATES PATENT OFFICE

TURNEY H. STOUGH, OF JEANNETTE, PENNSYLVANIA

HOT-PLATE ATTACHMENT FOR COOKING UTENSILS

Application filed February 25, 1930. Serial No. 431,158.

This invention relates to certain new and useful improvements in hot plate attachment for cooking utensils.

The main idea of this invention being to provide a hot plate attachment for cooking utensils of any character, the same will, for purposes of illustration and specific description, be hereinafter referred to as a hot plate attachment for spiders or frying pans, the attachment of the hot plate to the cooking utensil or frying pan operating to prevent the burning of contents of the frying pan and for even distribution of heat over the frying pan.

A further object of this invention is to provide a hot plate attachment for frying pans wherein the latter is constructed for the removable attachment of the hot plate so that the same may be used with or without the hot plate as desired.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a frying pan constructed in accordance with the present invention;

Figure 2 is a cross-sectional view taken on line 2—2 of Figure 1 showing the hot plate attached to the frying pan beneath the same;

Figure 3 is a perspective view of the hot plate detached from the frying pan;

Figure 4 is a fragmentary vertical longitudinal sectional view showing the lip on the hot plate removably engaged by a keeper strap forming a part of the frying pan handle; and Figure 5 is a detail sectional view taken on line 5—5 of Figure 4.

Referring more in detail to the accompanying drawing, it being understood that the hot plate is adapted for attachment to the cooking vessel or utensil of any character, the reference numeral 10 designates the bottom of a frying pan having an upwardly flaring side wall 11 with a handle attached to the side wall.

The handle 12 is enlarged at the end thereof that is attached to the side wall 11 of the frying pan with the enlarged end angularly bent relative to the handle providing side ears 13 secured by rivets 14 or other fastening means to the side wall 11 with the intermediate portion of the enlarged end between the side ears 13 offset from the side wall to provide a strap 15 defining a pocket between the side wall and strap. The outer end of the handle 12 receives a collar or sleeve 16, the major portion of which is spaced from the handle providing an air space to insulate the handle sleeve 16 from the frying pan handle 12.

The hot plate attachment comprises a plate 17 carrying a depending peripheral flange 18 and having concentric series of spaced upstanding beads 19 carried by the plate 17. A lip 20 projects upwardly and outwardly from one edge of the hot plate 17 and is secured thereto in any suitable manner as at 21, the lip 20 having offset ribs 22 spaced inwardly of the edges thereof to provide for wedging contact with the side walls 11 of the frying pan and the strap 15 when inserted in the pocket therebetween. The lip 20 is inserted in the pocket between the wall 11 and strap 15 to be frictionally retained therein and when so disposed, the hot plate 17 is arranged parallel with the bottom 10 of the frying pan as shown in Figure 4 with the frying pan supported upon the upstanding beads 19. With the use of the hot plate attachment for frying pans, food cooked in the frying pan will not scorch or burn, the foods being cooked more slowly and with a smaller quantity of cooking fat resulting in the cooking or frying of more palatable food. The hot plate attachment may be separated from the frying pan and the latter used in the ordinary way.

While there is herein shown and described the preferred embodiment of the invention, it is nevertheless to be understood that minor changes may be made therein without departing from the spirit and scope of the invention as claimed.

I claim:—

1. A hot plate attachment for frying pans comprising a frying pan having a flaring side wall, a handle attached to the side wall with a pocket formed between the handle and side wall and a hot plate having a lip extended angularly therefrom to be removably received in the pocket.

2. A hot plate attachment for frying pans comprising a frying pan having a flaring side wall, a handle attached to the side wall with a pocket formed between the handle and side wall and a hot plate having a lip extended angularly therefrom to be removably received in the pocket, and said lip having offset beads for binding engagement with the walls of the pocket.

3. A hot plate attachment for frying pans comprising a frying pan having a flaring side wall, a handle for the pan having an enlarged angle end offset to provide edge attaching ears and an intermediate strap defining a pocket, a hot plate, and an angle lip extending from the edge thereof for removable reception in the pocket.

In testimony whereof I affix my signature.

TURNEY H. STOUGH.